United States Patent [19]

Selander

[11] 3,907,630

[45] Sept. 23, 1975

[54] METHOD OF FIBER BOARD ARTICLE PRODUCTION EMPLOYING PREDRYING OF THE LIGNO-CELLULOSIC MATERIAL PRIOR TO LIQUID SUSPENSION AND ARTICLE FORMATION, AND EMPLOYING WATER RECIRCULATION

[75] Inventor: Stig Selander, Stockholm, Sweden

[73] Assignee: Defibrator AB, Stockholm, Sweden

[22] Filed: Nov. 21, 1973

[21] Appl. No.: 418,005

Related U.S. Application Data

[63] Continuation of Ser. No. 217,109, Jan. 12, 1972, abandoned.

[30] Foreign Application Priority Data

Jan. 20, 1971 Sweden .................................. 669/71

[52] U.S. Cl. ..................... 162/13; 162/17; 162/24; 162/186; 162/188; 162/190; 162/206; 162/225; 162/264; 162/305
[51] Int. Cl. ......... D21c 9/18; D21f 1/66; D21j 3/00
[58] Field of Search ............. 162/264, 190, 225, 13, 162/17, 24, 186, 206, 305, 188

[56] References Cited
UNITED STATES PATENTS

| | | | |
|---|---|---|---|
| 2,016,657 | 10/1935 | Streeter | 162/225 X |
| 2,156,445 | 5/1939 | Baxter | 162/264 X |
| 2,373,914 | 4/1945 | Quinn | 162/186 X |
| 2,633,062 | 3/1953 | Gaston | 162/225 X |
| 2,675,745 | 4/1954 | Novak | 162/190 X |
| 2,924,548 | 2/1960 | Cotton | 162/208 X |
| 3,056,718 | 10/1962 | Grissom et al. | 162/225 X |
| 3,446,697 | 5/1969 | Alvang et al. | 162/23 X |

*Primary Examiner*—S. Leon Bashore
*Assistant Examiner*—Richard H. Tushin
*Attorney, Agent, or Firm*—Eric Y. Munson

[57] ABSTRACT

Fiber board articles are formed by first defibering the ligno-cellulosic material, then pre-drying the defibered material with a gaseous heating medium, forming a suspension of the defibered and dried material in water, forming blanks of fiber board by draining liquid from the suspension through a forming wire, pressing the board produce to a dryness of up to 65% and subjecting the board in blank form to final drying under heat and mechanical pressure. The pre-drying of the defibered material prior to suspension in liquid is conducted so as to bring the material to a dryness level which is equal to or higher than the dryness level of the board product subsequent to formation and pressing, such that only water in steam phase is released during the final drying step. Substantially all the water which is separated from the board during the formation and pressing steps is recirculated to suspension step.

4 Claims, 1 Drawing Figure

US Patent Sept. 23, 1975 3,907,630
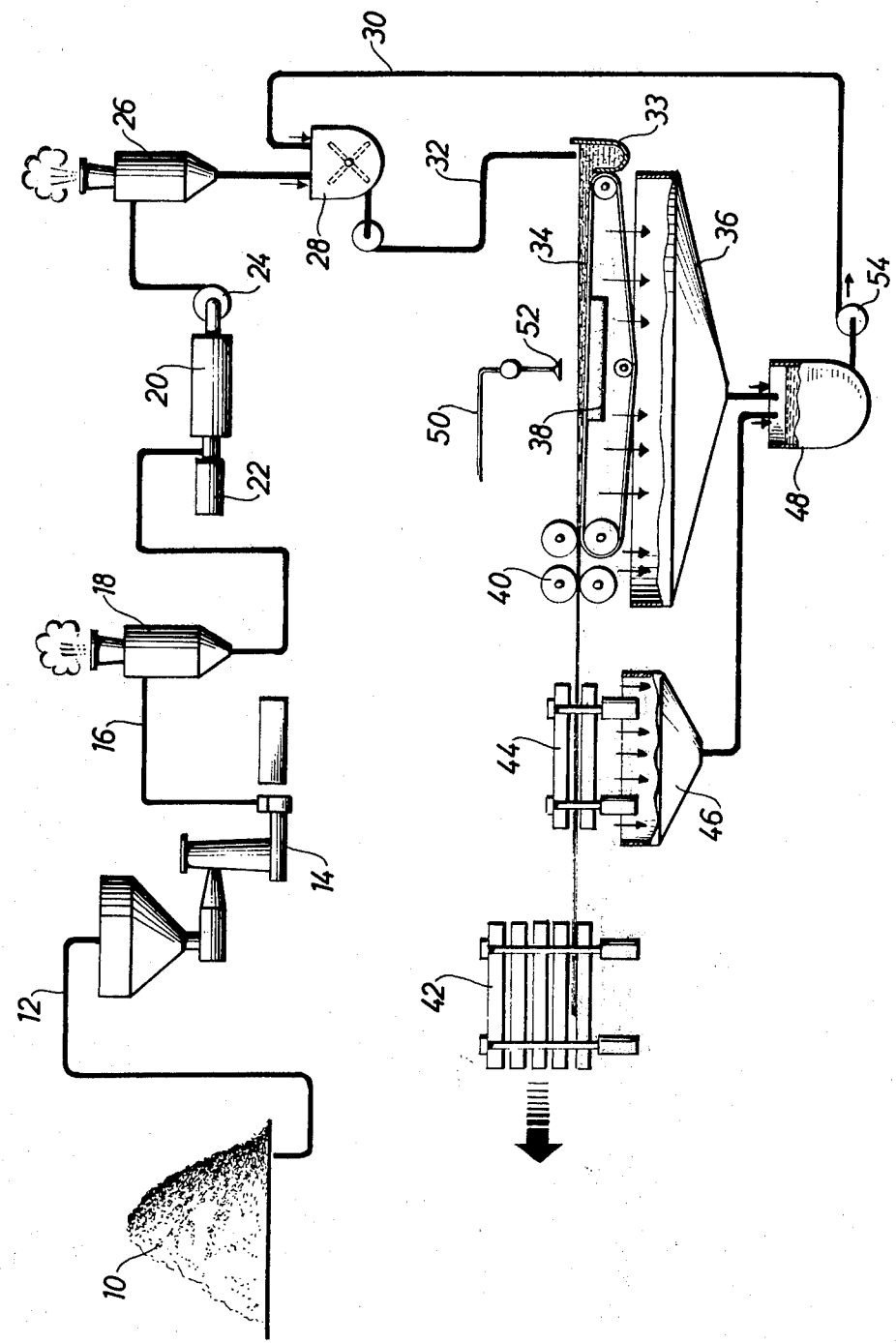

3,907,630

METHOD OF FIBER BOARD ARTICLE PRODUCTION EMPLOYING PREDRYING OF THE LIGNO-CELLULOSIC MATERIAL PRIOR TO LIQUID SUSPENSION AND ARTICLE FORMATION, AND EMPLOYING WATER RECIRCULATION

This is a continuation of application Ser. No. 217,109, filed Jan. 12, 1972, now abandoned.

FIELD OF THE INVENTION

This invention relates to a method in the manufacture of shaped articles, such as slabs or boards of lignocellulose containing material, which method comprises, in sequence, defibration of the material in at least one step, suspension of the defibrated material in a transport liquid, forming of blanks for the shaped articles from the suspension, mechanical separation of transport liquid, and final drying under heat and pressure.

THE PRIOR ART

In the conventional so-called wet method, the forming of the blanks for shaped articles is effected from a suspension of the defibrated material, followed by a dewatering treatment usually to a dry content of 30–40 per cent. The blanks are then transferred to a hot press in which the final dewatering is effected by mechanically squeezing out water present in liquid state to dry contents within the range of 50 to 55 per cent, whereas remaining water is evaporated by supply of heat through the pressing plates of the hot press.

According to the so-called dry method it is known, on the other hand, to manufacture fiber boards and similar products without utilization of water as a transport vehicle in the forming of the blanks. The shaped articles are in this method formed directly from totally or partly dried fibers by utilization of some pneumatic forming technique. Blanks of shaped articles with a dry content from 50 up to 100 per cent are precompressed without water being squeezed off, and thereupon introduced into the hot press where the final compression and dewatering is effected. In the hot press also, no water is caused to escape in liquid state.

Both these methods have found extensive application. The wet method, however, has continued to be the dominating one, primarily for the reason that the process of manufacture is simple and that one, when employing water as a transport vehicle, easily controls the forming technique proper in the manufacture of the shaped articles. The most important drawback of the wet method resides in the fact that it requires a receiver for discharge of consumed transport water. This water contains constituents released from the treated raw material and therewith as a rule causes serious contamination of the receiver, such as a water-course, a lake or the like.

The dry method gains more and more ground primarily because it does not result in any discharge of transport liquid, and thus the inconveniences resulting therefrom, as far as conservation of nature is concerned. However, it does not permit the same good interconnection of fibers as the wet method, unless artificial bonding agents are admixed. The dry method thus usually requires an addition of expensive bonding agents within a quantity range of 1 to 12 per cent.

OBJECTS OF THE INVENTION

One main object of the invention is to provide a method which preserves the advantages of the wet method, primarily the good interconnection between the fibers, and simultaneously the advantages of the dry method as far as nature conservation is concerned.

SUMMARY OF THE INVENTION

To this end, the invention according to one of its main features consists in that the fibers after defibration step but prior to suspension step are given by evaporation of water, a dry content which is at least approximately as high as the dry content of the article blanks after the mechanical separation of liquid therefrom. Said evaporation may be effected by self-drying, but is is preferred to effect the predrying operation by supply of heat to the defibrated material.

SHORT DESCRIPTION OF THE DRAWING

The invention will be described in more detail with reference to a flow diagram shown in the accompanying drawing.

DETAILED DESCRIPTION OF THE DRAWING

From a storage supply 10, lignocellulose-containing raw material in piece form, such as chops or chips, is supplied through a conduit 12 to a disintegrating station 14 where the material is defibrated and/or refined. The disintegration of the raw material to fiber pulp can be effected in one or several steps, either under atmospheric pressure or under super-atmospheric pressure, and at increased temperature. Thereupon, the material is conveyed through a conduit 16, in which a cyclone separator 18 may be provided for evaporation by centrifugal force, to a predrying station 20 which preferably is combined with a heat generator 22 which generates hot gases. In this predrying station, the dry content of the fiber product is increased through direct or indirect contact with said gases to a level which is equal to or even higher than the dry content which the article blank may be given by purely mechanical compression prior to the drying thereof in a hot press. By means of a fan system 24, the dry fiber pulp is conducted, through a second cyclone separator or steam separator 26, to a pulp chest 28 in which the fiber pulp is suspended in water which is admitted through a pipe 30, as will become evident from the following. The fibrous material is then conveyed as aqueous suspension through a pipe 32 to a forming station 33 for board blanks, which station operates in known manner by dewatering, such as drainage through a wire 34 movable along an endless path. Hereunder, the main portion of the water serving as transport vehicle is separated off, to be collected in a vat 36 or the like container. The dewatering within the forming device can also be effected by means of a vacuum or suction box 38 and/or by squeezing in a roller press 40. The dry content of the fiber board blanks produced in the forming station 33 may be varied within wide limits, usually between 20 and 60 up to 65 per cent, depending upon the kind of the means employed for the removal of water. From the forming station 33, the shaped body blanks are guided either directly to a hot press 42 or, if they have not yet a sufficiently high dry content, such as a content exceeding 50 per cent, to a preceding press 44, where additional mechanical squeezing out of water in liquid phase is effected. Ahead of the hot press 42, the dry content must be so high that the drying in said press is effected solely by causing water to escape in steam phase and thus not in liquid phase. The hot press may be constructed as a multistorage press and has press plates in known manner between which the fiber board blanks are subjected to a combined compressing and heating treatment to final shape. Water escaping from the precompressing press 44 is collected in a vat 46 and is fed to a container 48 which may be common for the vat 36 also.

If the quantity of water evaporated at the predrying station 20 exceeds the quantity of water discharged to the container 48 from the mechanical dewatering treatment, liquid preferably in the form of fresh water can be supplied through a pipe 50 to nozzles or spraying devices 52 at the forming station 33, such as ahead of the vacuum suction box 38. The fresh water may also contain desired chemicals, which thus will be contained in the final product. By this supply of water onto the top surface of the board blanks, lignocellulose-containing substances dissolved in the top layer will be displaced from the surface towards the interior of the blanks. This is of great importance in order to avoid miscoloring or soiling of e.g. the compressing press. The supplied fresh water replaces the loss of water caused by the predrying operation at the station 20.

The water collected in the container 48 is conducted upwards by a pump 54 and a pipe 56 into the chest 28 for suspension of new quantities of dried pulp. Due to the evaporation of water within the station 20, no discharge of water of manufacture into the surroundings need be effected.

The advantage obtained by effecting the purely mechanical dewatering prior to, and ahead of, the hot press, which squeezing operation thus can be effected at low temperatures, is that in this way additional dissolution of lignocellulose-containing constituents out of the fibrous material is avoided, which dissolution, to the contrary would take place if a mechanical dewatering should be effected at the increased temperature prevailing in the hot press. The shaped products dried in the hot press by supply of heating medium through the press are thereupon retracted from the system for additional treatment, such as adjusting to size. Thus, in the hot press preferably solely a pure evaporation of liquid still present in the blank, is allowed to be effected.

Lignocellulose-containing waste from said adjusting to size is suitably disintegrated without addition of water, whereupon the finely divided product is returned to the system to be used for that pulp suspension which is used for the forming of the shaped articles in wet state.

In some cases it is conceivable to permit a minor excess of transport liquids by allowing the dry content of the blanks supplied to the final drying step to exceed that of the finely divided fibrous material fed to the process. The excess of transport liquid is then treated in such a manner, that lignocellulose-containing substances dissolved therein are rendered harmless or transferred to another process.

While one specific embodiment of the invention has been shown and described, it is to be understood that this is for purpose of illustration only, and that the invention is not to be limited thereby, but its scope is to be determined by the appended claims.

What is claimed is:

1. In the method of producing formed bodies of lignocellulose-containing material comprising the steps of (a) defibering the material in at least one stage, (b) forming the defibered material into a suspension thereof in water, said water serving as propellant liquid for the defibered material, (c) forming blanks for shaped articles from said suspension by mechanically separating and pressing water in liquid phase from said suspension, and (d) thereafter subjecting the blanks to final drying under heat and mechanical pressure, the improvement which comprises subjecting the defibered material, prior to said suspension-forming step (b) to a pre-drying action with a gaseous heating medium to a condition in which its dry content is brought to a level which is at least equal to or higher than the dry content of said blanks after mechanical separation of water in said forming step (c) so that water is removed substantially only in steam phase during said drying step (d) while substantially all water separated from said suspension in said forming step (c) is recirculated to the suspension-forming step (b).

2. The improvement according to claim 1, wherein fresh water is added to said blanks formed in step (c).

3. The improvement according to claim 2, wherein said fresh water is added in such a manner that lignocellulose-containing substances dissolved in the top layer of said blanks will be displaced from the surfaces toward the interior of the blanks.

4. The improvement according to claim 2, wherein chemicals which affect the qualitative characteristics of the final formed bodies of lignocellulose-containing material are added to the formed blanks together with the fresh water.

* * * * *